(12) United States Patent
Blackmore

(10) Patent No.: US 10,315,272 B2
(45) Date of Patent: Jun. 11, 2019

(54) METHOD FOR THE PRODUCTION ON A THREE-DIMENSIONAL PRODUCT

(71) Applicant: ROLLS-ROYCE plc, London (GB)

(72) Inventor: Michael Lewis Blackmore, Sheffield (GB)

(73) Assignee: ROLLS-ROYCE plc, London (GB)

( * ) Notice: Subject to any disclaimer, the term of this patent is extended or adjusted under 35 U.S.C. 154(b) by 27 days.

(21) Appl. No.: 15/012,076

(22) Filed: Feb. 1, 2016

(65) Prior Publication Data
US 2016/0228975 A1    Aug. 11, 2016

(30) Foreign Application Priority Data
Feb. 9, 2015 (GB) .................................. 1502087.8

(51) Int. Cl.
*B22F 5/04* (2006.01)
*B23P 15/04* (2006.01)
(Continued)

(52) U.S. Cl.
CPC ............ *B23K 15/0086* (2013.01); *B22F 5/04* (2013.01); *B23K 15/0026* (2013.01);
(Continued)

(58) Field of Classification Search
CPC .... B23K 15/0026; B33Y 10/00; B33Y 80/00; B22F 2003/245; B22F 2003/247;
(Continued)

(56) References Cited

U.S. PATENT DOCUMENTS

2006/0118532 A1* 6/2006 Chung .................. B22F 3/1028
219/121.85
2007/0193646 A1* 8/2007 Tapphorn ................ B05B 7/144
141/2
(Continued)

FOREIGN PATENT DOCUMENTS

EP    1 669 143 A1    6/2006
EP    2 832 473 A1    2/2015
(Continued)

OTHER PUBLICATIONS

Apr. 29, 2015 Search Report issued in British Patent Application No. 1502087.8.
Jul. 7, 2016 Extended Search Report issued in European Patent Application No. 16153596.8.

*Primary Examiner* — Dana Ross
*Assistant Examiner* — Joe E Mills, Jr.
(74) *Attorney, Agent, or Firm* — Oliff PLC

(57) ABSTRACT

There is disclosed a method for the production of a three-dimensional product (2) via an additive layer manufacturing process such as an electron beam manufacturing process to selectively fuse parts (17) of a powder bed (16), said parts (17) corresponding to successive cross-sections of the product (2). The method involves the use of said additive layer manufacturing process to form a tool (12) by selectively fusing additional parts (18) of the powder bed (16), said additional parts (18) corresponding to successive cross-sections of the tool (12). The method also comprises a subsequent step of manipulating the tool (12) perform a processing function on the product (2).

20 Claims, 10 Drawing Sheets

(51) Int. Cl.
*B22F 3/24* (2006.01)
*B22F 5/00* (2006.01)
*B23K 15/00* (2006.01)
*B33Y 10/00* (2015.01)
*B33Y 80/00* (2015.01)

(52) U.S. Cl.
CPC ............... *B33Y 10/00* (2014.12); *B33Y 80/00* (2014.12); *B22F 2003/245* (2013.01); *B22F 2003/247* (2013.01); *B22F 2005/001* (2013.01); *B22F 2005/002* (2013.01); *B22F 2202/01* (2013.01); *B22F 2998/10* (2013.01); *B23P 15/04* (2013.01); *F05D 2230/31* (2013.01)

(58) Field of Classification Search
CPC .......... B22F 2005/001; B22F 2005/002; B22F 2998/10; B22F 3/1055; B22F 5/04; B23P 15/04; B29C 67/0077
USPC .......................................... 219/121.6, 121.85
See application file for complete search history.

(56) References Cited

U.S. PATENT DOCUMENTS

| | | | |
|---|---|---|---|
| 2010/0291401 A1* | 11/2010 | Medina | B23K 15/0086 428/593 |
| 2013/0112366 A1* | 5/2013 | Mottin | B22F 5/04 164/494 |
| 2015/0336171 A1* | 11/2015 | Matejczyk | B22F 3/1055 419/14 |
| 2016/0089859 A1* | 3/2016 | Lacy | B32B 15/01 428/596 |
| 2016/0236412 A1* | 8/2016 | Kusahara | B28B 7/465 |
| 2016/0332371 A1* | 11/2016 | Staroselsky | B29C 67/0077 |

FOREIGN PATENT DOCUMENTS

| | | |
|---|---|---|
| GB | 2517490 A | 2/2015 |
| WO | 2013/137283 A1 | 9/2013 |

* cited by examiner

METHOD FOR THE PRODUCTION ON A THREE-DIMENSIONAL PRODUCT

The present invention relates to a method for the production of a three-dimensional product, and more particularly relates to such a method involving an additive layer manufacturing (ALM) process to selectively fuse parts of a powder bed.

Additive layer manufacturing has become more widely used over recent years in order to produce three-dimensional products. Electron Beam Melting (EBM) is a particular type of ALM technique which is used to form fully dense metal products (such as component parts for gas turbine engines in the aerospace industry). The technique involves using an electron beam in a high vacuum to melt metal powder in successive layers within a powder bed. Metal products manufactured by EBM are fully dense, void-free, and extremely strong.

FIG. 1 illustrates a known and conventional configuration of apparatus 1 which is used in are EBM method to produce a three-dimensional metal product 2 from metal powder 3. The apparatus comprises an adjustable height work platform 4 upon which the product 2 is to be built, a powder dispenser 5 such as a hopper, a rake 6 or other arrangement operable to lay down a thin layer of the powder 3 on the work platform 4 to form the powder bed 7, and an electron beam column 8 for directing and focussing an electron beam 9 downwardly on the powder bed 7 in order to melt parts of uppermost layer of the powder bed 7. The entire apparatus is housed within a vacuum housing and the operative parts are computer controlled.

During operation, the electron beam column 8 is energised under the control of the computer to focus the electron beam 9 onto the powder bed 7 and to scan the beam across the powder bed to melt a predetermined area of the top layer of the powder bed 7 and thereby form a cross-section of the three-dimensional product 2.

The three-dimensional product 2 is built up by the successive laying down of powder layers on the powder bed 7 and melting of the powder in predetermined areas of the layers to form successive cross-sections of the product 2. During a work cycle the work platform 4 is lowered successively relative to the electron beam column 8 after each added layer of powder has been melted, ready for the next layer to be laid down on top by operation of the rake 6. This means that the work platform 4 starts in an initial position which is higher than the position illustrated in FIG. 1, and in which position a first layer of powder of necessary thickness is laid down on the work platform 4 by the rake 6. In order to prevent damage to the work platform 4 by the electron beam 9, the first layer of powder is typically made thicker than the other applied layers, thereby preventing melt-through by the electron beam 9. This is why the product 2 appears spaced above the work platform 4 within the powder bed 7 in FIG. 1. The work platform 4 is then successively lowered for the laying down of a new powder layer for the formation of a new cross-section of the product 2.

When the electron beam 9 in on the top layer of powder within the powder bed 7, the kinetic energy of the electrons is transformed into heat which melts the powder to form the respective cross-section of the product 2. The layer previously scanned usually serves as a rigid support for the next layer above. The exemplary product 2 depicted in FIG. 1 (in vertical cross-section) is formed so as to have a cavity in the form of a narrow through-passage 10 extending from one side of the product to the other side of the product.

As will be appreciated, the above-described EBM process operates at very high temperatures (typically in the region of 600° C. in the case of manufacturing in titanium). The electron beam is used to sinter the loose powder in each layer before carrying out the actual step of melting the powder. A consequence of this process is therefore the creation of a "cake" of sintered powder which encases the component formed by the EBM process, which must then be removed from the component. Given the significant expense of some metal powders such as titanium it is also important to recycle the sintered powder after it has been removed from the component.

The "cake" of sintered powder is typically removed from the product 2 by placing the caked component in an air-operated blasting cabinet wherein loose metallic powder is used to break sinter bonds and re-atomise the sintered powder back to individual powder particles which can then be recycled and used again in subsequent EBM process.

However, it has been found that this technique for removing the sintered powder from components is only effective on external surfaces of components or in large enclosed cavities formed in the component where a spray nozzle can provide sufficient access to impinge on the sintered powder therein. In tortuous passages, through holes or narrow openings and deep cavities formed in the component, such as the narrow through-passage depicted in FIG. 1, it has been found that this conventional technique is not capable of removing sufficient sintered powder. This therefore increases the amount of powder which is lost in the sense that it cannot be recovered and recycled. Also, if powder is left trapped inside such cavities in the component then it can adversely affect the subsequent function of the component. For example, in the case of engine components, the powder could subsequently be ingested into the engine oil if it is not properly removed at the manufacturing stage.

Whilst the problems associated with the prior art are discussed above with specific reference to EBM processes, it is to be noted that the same or similar problems could also arise in other additive layer manufacturing processes such as Laser Melting and Laser Sintering processes. Therefore, whilst aspects of the present invention are described herein with particular reference to EBM processes, it should be noted that embodiments of the invention may involve the use of other additive layer manufacturing processes, such as Laser Melting processes or Laser Sintering processes.

It is therefore an object of the present invention to provide an improved method for the production of a three-dimensional product via an additive layer manufacturing process.

According to an aspect of the present invention, there is provided a method for the production of a three-dimensional product via an additive layer manufacturing process to selectively fuse parts of a powder bed, said parts corresponding to successive cross-sections of the product, the method involving the use of said additive layer manufacturing process to form a tool by selectively fusing additional parts of the powder bed, said additional parts corresponding to successive cross-sections of the tool, and wherein the method comprises a subsequent step of manipulating the tool to perform a processing function on the product.

The additive layer manufacturing process may be used to form said tool simultaneously with at least part of said product.

The additive layer manufacturing process may comprise the steps of a) laying down a powder layer on said powder bed, and b) focussing energy on a predetermined area of said powder layer to fuse said area of the powder layer and thereby form a cross-section of the product; wherein steps a)

and b) are repeated to form successive cross-sections of the product, and wherein at least some of said successive steps b) involve focussing energy on a designated tool area of the respective powder layer, to fuse the tool area and thereby form successive cross-sections of said tool within the powder bed.

The method may be used to manufacture a metal component, in which said powder is metal powder, and in which said steps of focussing energy on said areas of the powder layers involves the use of an electron beam to melt said areas of the powder layers.

In preferred embodiments, the additive layer manufacturing process is an electron beam melting process.

Optionally, said tool is formed in spaced relation to at least one surface of the product.

Conveniently, said tool is shaped such that at least part of the tool substantially conforms to the shape of the or each said surface.

The tool can, optionally, be provided with surface protrusions, for example ribs or spikes which aid in the disruption of the powder when the tool is agitated.

Said processing function performed on the product may involve using the tool to remove sintered powder, arising from the additive layer manufacturing process, from the product.

Conveniently, said step of manipulating the tool involves vibrating the tool and/or the product in which the tool is contained. Vibration can be provided by a vibrating jig into which the product is introduced. Vibration can be in a single or multiple planes.

The tool and/or product may be subjected to ultrasonic vibrations.

In some embodiments, said product is formed so as to have a cavity, and said tool is formed in a position in which it is at least partially located within said cavity. In such embodiments, said processing function may involve using the tool to remove said sintered powder from within the cavity.

Said tool is optionally formed in a position in which part of the tool projects from the cavity, said projecting part of the tool being used for manipulation of the tool.

Said cavity may be provided in the form of a passage extending through at least part of the product.

Said tool may extend substantially completely through said passage in spaced relation to the or each internal surface of the passage.

Optionally, said passage follows a non-linear path, and said tool may be shaped to follow said path.

The cavity may comprise a simple passage with exit and entry through holes in a single plane. In more complex products, the cavity may comprise multiple holes and/or passages interconnecting along multiple planes. In the latter case, multi-plane vibration is particularly appropriate. In the latter case, the tool may be provided with multiple branches extending into multiple passages.

As an optional final step, the tool may be removed from the cleared cavity. To aid in the removal, the tool may be constructed to include one or more strategically placed frangible points at which, under an appropriately applied force, break, allowing the resulting pieces to clear bends in the cavity and pass through the cavity to an exit hole provided in the surface of the product. Alternative removal methods might involve a local chemical or heat treatment of the tool independent of the product to encourage its disintegration and removal from the product.

The method optionally further includes the step of chemically treating the material of the tool, after its formation and before said manipulation, to harden the material of the tool relative to the material of the product.

Said processing function performed on the product may, in some embodiments, involve using the tool to polish the product.

According to another aspect of the present invention, the above-defined method may be used to manufacture a component of a gas turbine engine.

So that the invention may be more readily understood, and so that further features thereof may be appreciated, embodiments of the invention will now be described by way of example with reference to the accompanying drawings in which.

Figure 2:
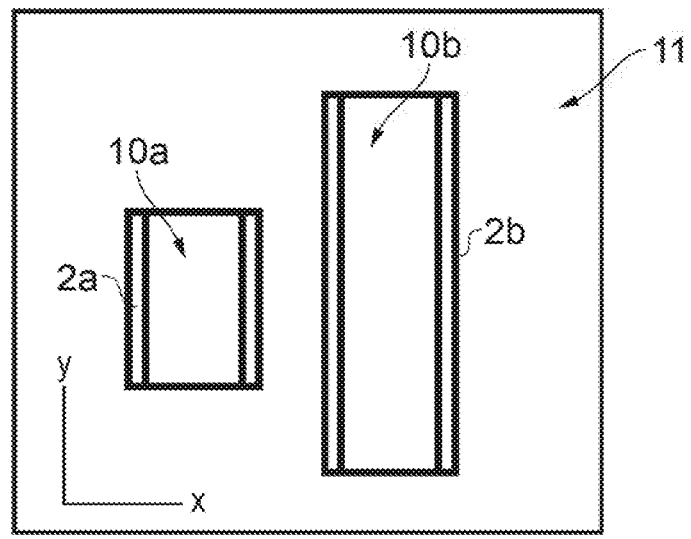
FIG. 2 is a schematic cross-sectional view showing two exemplary products, each having a cavity in the form of a through-passage, encased in a "cake" of sintered powder following formation of the products via an EBM process.

Turning now to consider the drawings in more detail, FIG. 2 shows a pair of discrete products 2a, 2b which have been produced by an EBM process along the lines explained above. Each product 2a, 2b is shown in the form of a simple hollow tube having a respective cavity 10a, 10b in the form of a through-passage, although it is to be appreciated that these configurations are illustrated merely for simplicity and convenience; it being envisaged that the method of the present invention will be useful in producing much more intricately shaped components. As will be noted, the left-hand product 2a shown in FIG. 2 is significantly shorter than the right-hand product 2b, which means that the passage 10a through the left-hand product is relatively wide in the x-direction compared to its length in the y-direction, whilst the passage 10b through the right-hand product 2b is relatively narrow in the x-direction compared to its length in the y-direction.

FIG. 2 also shows a "cake" of sintered powder 11 encasing the two products 2a, 2b. The sintered powder is formed during the EBM method used to form the two components in the manner described above, and must be removed from the products following their formation via the EBM process. It is of course preferable to remove the sintered powder in a manner which allows into be recycled for use in a subsequent EBM processes. As will be noted, the sintered powder 11 is shown entirely encapsulating the two products, and most notably substantially filling the passages 10a, 10b formed through the products. As explained above, it has been found to be particularly troublesome to remove all of the sintered powder 11 from within such internal passages 10a, 10b or other cavities, particularly those which are small, narrow or tortuous in configuration and hence difficult to penetrate with a jet of cleaning air.

Figure 3:
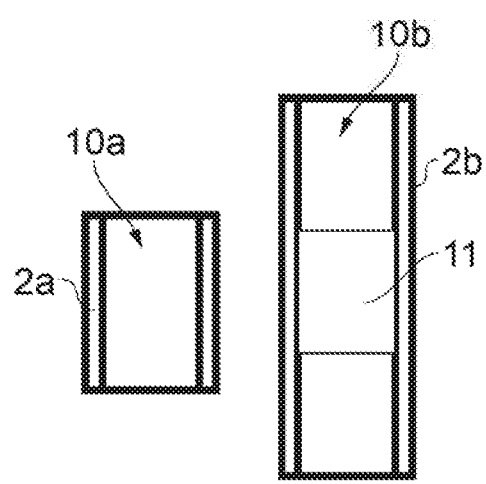
FIG. 3 is a view similar to that of FIG. 2, but which depicts the two products following a conventional process to remove the sintered powder via air blasting.

FIG. 3 shows the two products 2a, 2b following an initial step to remove the sintered powder 11, and in particular following a generally conventional prior art step in which the products are air-blasted as described generally above. As will be noted, whilst the prior art air-blasting process has been effective to remove substantially all of the sintered powder from the external surfaces of both products 2a, 2b, and also from within the relatively short passage 10a of the left-hand product 2a, it has not been effective to remove all of the sintered powder 11 from within the longer passage 10b of the right-hand product 2b. This is because the conventional air-blasting apparatus used in prior art methods cannot direct a jet of blasting air with sufficient energy sufficiently far in to the relatively long and narrow passage 10b to break sinter bonds and re-atomise the sintered powder back to individual powder particles.

The method of the present invention proposes the production of a tool, from the same powder bed from which the product 2 is formed, in order to assist in removal of sintered powder from within hitherto difficult to access cavities and spaces such as the relatively long and narrow passage 10b illustrated in FIGS. 2 and 3. The manner in which the tool can be formed will be described in more detail hereinafter, but FIG. 4 illustrates schematically the use of such a tool 12 to assist in removal of the sintered powder 11 from within the cavity 10 of a product which, as explained above, often cannot be completely removed via the prior art air-blasting process.

Figure 4:
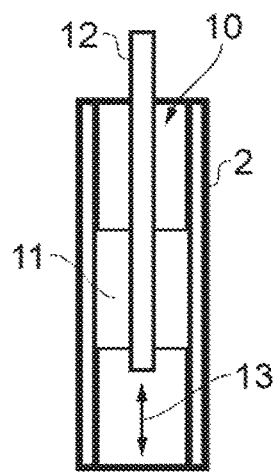
FIG. 4 is a schematic cross-sectional view showing one of the products shown in FIGS. 2 and 3, with a tool provided within the product's cavity to aid in the complete removal of sintered powder therein.

FIG. 4 shows an exemplary tool 12 having a generally elongate configuration in which it extends into and passes through the central region of a cavity 10 formed within the product 2. As will be noted, the cavity 10 illustrated in FIG. 4 has a similar configuration to the cavity 10b shown in the right-hand product 2b of FIG. 2, and thus can be considered to be a somewhat long and narrow through-passage of a type which is thus particularly susceptible to the retention of sintered powder 11 following a prior art air-blasting process. It is proposed that the tool 12 will be formed in the position illustrated in FIG. 4, simultaneously with at least a region of the product 2 itself, from the same powder stock and via the same ALM method. However, it is to be appreciated that this is not an essential requirement. Embodiments of the present invention are envisaged in which the tool might be produced after the product itself has been formed; for example to remove sintered powder from an external surface of the product.

As shown in FIG. 4, the tool 12 is quite significantly narrower in the width direction than the internal width of the passage 10, and is shown located generally along the longitudinal axis of the passage 10. The tool 12 is thus provided in spaced relation to the internal surface of the passage 10. Whilst in some embodiments a tool can be formed which has a width substantially equal to, or slightly narrower than, the internal width of the passage 10, it has been found that often acceptable results can be achieved from a narrower tool 12 such as the type illustrated in FIG. 4.

FIG. 4 shows the tool remaining in the position within the cavity 10 in which it was formed, after an initial prior art air blasting step to remove sintered powder from the product. As will be noted, however, a central plug of sintered powder 11 still remains within the passage, as described above with reference to FIG. 3. The tool 12 extends through the remaining plug of sintered powder 11, and of course will itself be encased in the sintered powder arising from the EBM process used to form the tool. A short length of the tool 12 projects outwardly from one end of the passage 10 and can thus be used to manipulate the tool 12, for example by being gripped or otherwise engaged by a suitable apparatus or robot.

The tool 12 can then be manipulated to assist in the removal of the remaining plug of sintered powder 11 in the passage 10. The particular way in which the tool 12 might be manipulated can vary and will depend on the nature of the sintered powder 11 and the form and path of the passage 10. However it has been found that particularly good results can be achieved by vibrating the tool 12, for example in a longitudinal direction as denoted by arrow 13 in FIG. 4, at high frequency and low amplitude. The tool 12 may therefore be subjected to ultrasonic vibrations, which can be achieved by clamping the end of the tool in an ultrasonic vibrator.

By vibrating the tool 12 in this manner, the tool 12 abrades the sintered powder in contact with the tool and thereby rapidly disintegrates the sintered powder 11, breaking the sinter bonds and re-atomising the sintered powder back to individual powder particles which can then be collected for recycling and re-use in a subsequent EBM process.

Figure 5:
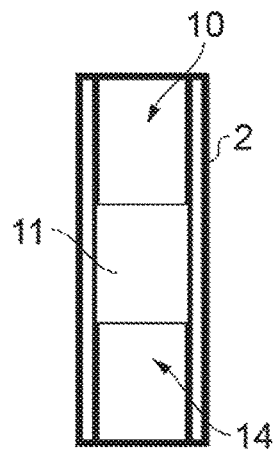
FIG. 5 is a view corresponding generally to that of FIG. 4, but which shows sintered powder remaining in the cavity of the product following manipulation and removal of the tool.

Whilst the vibrating tool 12 can be further manipulated to move it from side to side within the passage 10, to thereby bring the tool into contact with more of the sintered powder plug 11 remaining in the passage, it has been found that in many cases this might not be required. For example, FIG. 5 shows the sintered powder 11 remaining after the above-described step of axially vibrating the tool 12 with minimal side to side movement across the width of the passage 10, and after subsequent removal of the tool 12 from the passage 10. As will be noted, this manipulation of the tool 12 is effective to form a narrow central channel 14 through the plug of sintered powder 11. It has been found that once this channel 14 has been formed in the plug of remaining sintered powder, a conventional prior art air-blasting process is then often sufficient to disintegrate and remove the remaining parts of the plug. This is because the channel 14 formed through the plug by the tool 12 allows a narrow flow of air from the air-blasting process to pass through the plug at increased speed, due to a throttling effect caused by the channel 14, thereby allowing a sufficiently high-energy flow of air to impinge on the remaining parts of the plug to disintegrate them. The resulting product 2 is shown in FIG. 6, and can be seen to be completely free from sintered powder both outside and inside the central passage 10.

Figure 6:
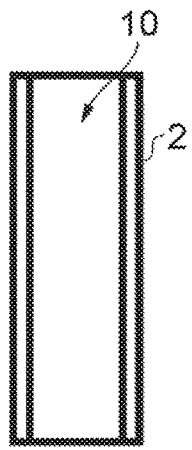
FIG. 6 is a view corresponding generally to that of FIG. 5, but which shows the remaining sintered powder having been removed by a subsequent air blasting step.
Figure 7:
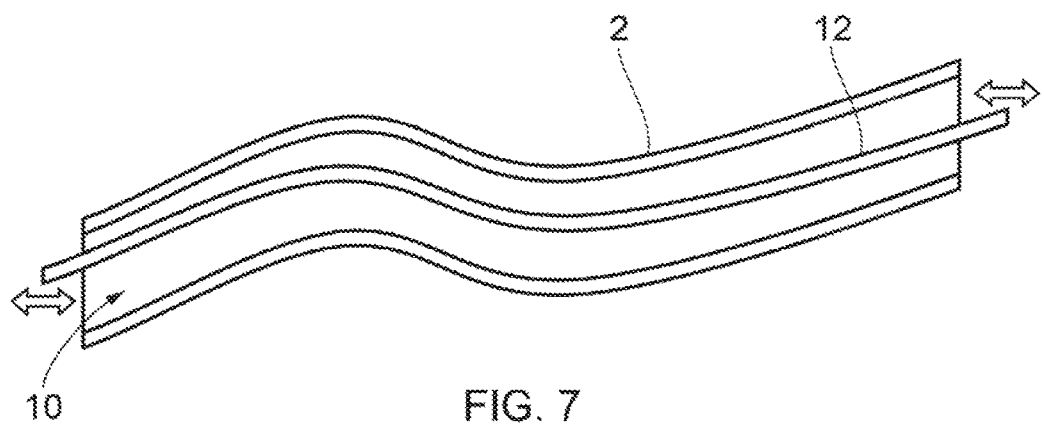
FIG. 7 is a schematic cross-sectional view showing another configuration of cavity formed within a product, with a tool located therein.

Turning now to consider FIG. 7, an alternative configuration of product 2 is shown, which again has an internal cavity in the form of an elongate passage 10. However, it will be noted that in this arrangement the passage 10 has a more intricately shaped configuration than those illustrated previously in FIGS. 2 to 6. In particular it will be noted that the passage 10 illustrated in FIG. 7 has a somewhat tortuous or so-called serpentine configuration, having a number of bends or curves along its length. Furthermore, it will be noted that the passage 10 has a configuration in which there is only a very narrow line of sight completely through the passage 10 from one end to the other. This type of passage configuration has been found to be particularly difficult to remove sintered powder from via a conventional prior art air-blasting technique because it significantly limits the access to the inside of the passage by a high pressure air jet.

As will thus be noted, the internal passage 10 shown in FIG. 7 is therefore provided with a tool 12 in a generally similar manner and for the same reasons as proposed above with respect to FIGS. 4 to 6. However, it will be noted that the tool 12 is shaped to follow the non-linear serpentine path of the passage, and again is provided in a form which is narrower than the passage such that the tool is spaced from the internal surface of the passage. The tool 12 will be used in a similar manner to that described above and may thus be subjected to ultrasonic vibrations as denoted by the arrows in FIG. 7, to disintegrate any remaining sintered powder in contact with the tool.

Figure 8:
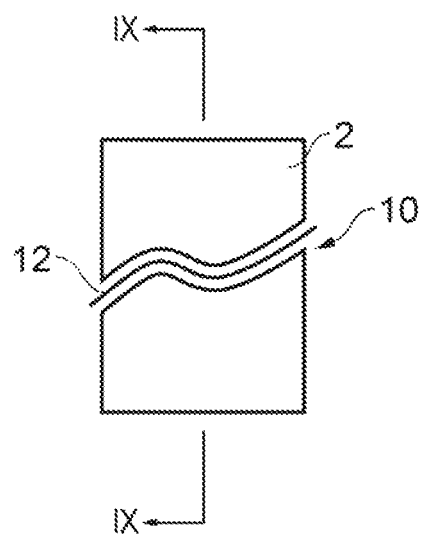
FIG. 8 is a cross-sectional view through an exemplary product having a cavity of similar configuration to that illustrated in FIG. 7.
Figure 9:
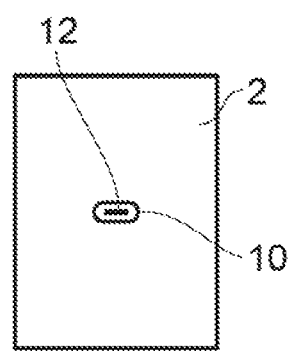
FIG. 9 is a cross-sectional view taken along line IX-IX in figure 9.

FIG. 8 illustrates schematically a larger product 2 having a similar through-passage 12 to that illustrated in FIG. 7. FIG. 9 shows a cross-sectional view through the product of FIG. 8, taken along line IX-IX shown in FIG. 8, to more clearly show the cross-sectional profile of the passage 10, which it is to be appreciated is merely exemplary and not limiting. The tool 12 is shown within the passage 10, in the position in which it can be formed via the method of the present invention. An embodiment of a method to form the product 2 and the tool 12 will now be described in detail below with particular reference to FIGS. 10 to 15.

Figure 1:
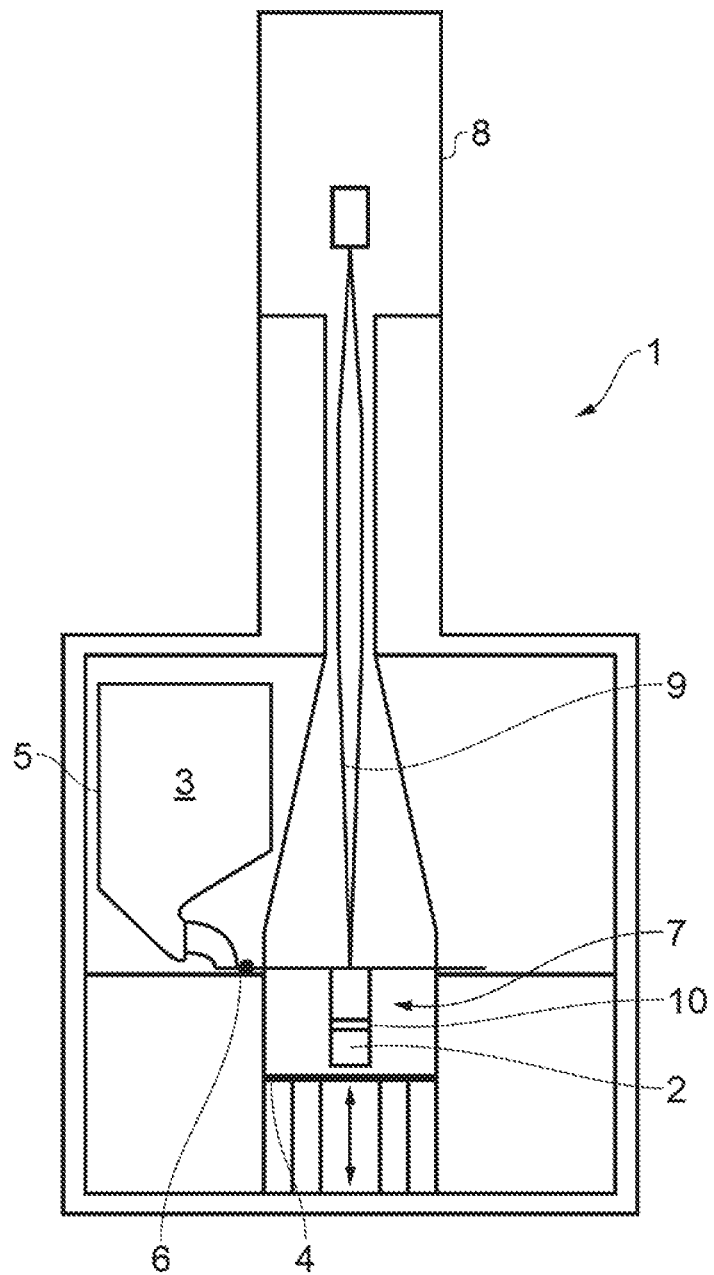
FIG. 1 is (discussed above) is a schematic vertical cross-sectional view showing a generally conventional apparatus suitable for use in an ALM method for the manufacture of a three-dimensional product from powder feedstock.
Figure 10:
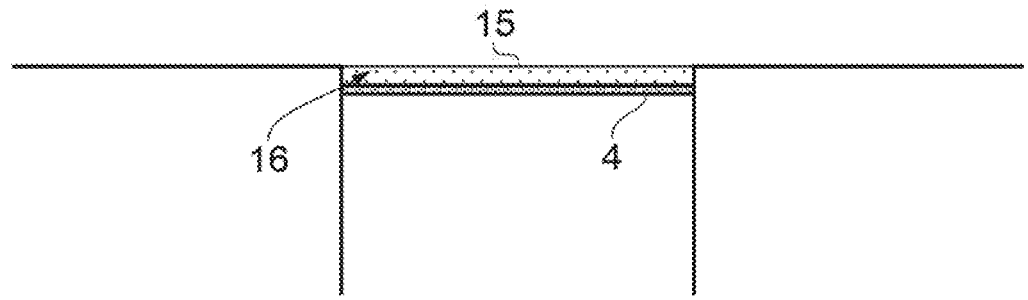
FIG. 10 is a schematic illustration showing an initial step in an ALM process forming part of the method of the present invention.

FIG. 10 illustrates an initial step in the method of manufacturing the product 2, and shows the work platform 4 of an EBM apparatus in an initial raised position. An initial layer 15 of metal powder feedstock is laid on the work table 4 to start a powder bed 16. The powder may be spread into the layer 15 via the rake 6 of the apparatus shown in FIG. 1. In a similar manner to prior art methods, the initial layer 15 of the powder bed 16 can be laid thicker than subsequent layers.

Figure 11:
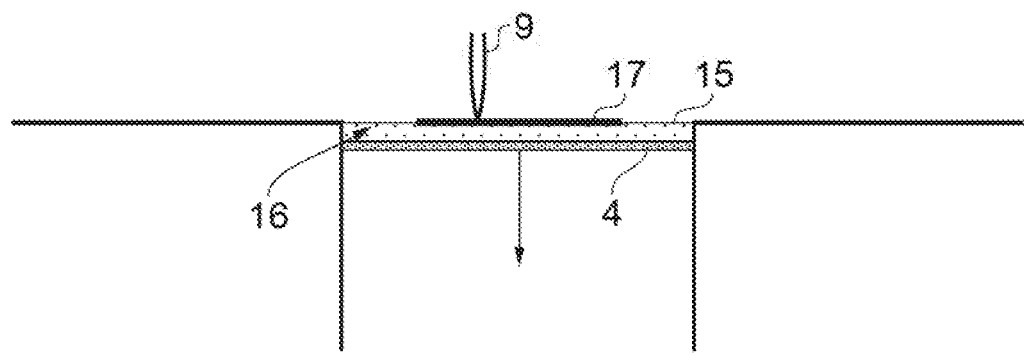
FIG. 11 is a view similar to that of FIG. 10, but which shows a subsequent step of the ALM process.

FIG. 11 shows a subsequent step in which an electron beam is focussed on and scanned across a predetermined area 17 of the initial powder layer 15. The beam 9 thus melts the powder in the predetermined area 17, thereby fusing the area 17 and forming an initial cross-section section of the product 2. The shape of the cross-section is effectively defined by the shape of the predetermined area 27.

The table 4 is then lowered and another layer of powder is laid on top of the first layer 15, thereby adding to the powder bed 16, whereupon the electron beam 9 is again focussed on and scanned across a corresponding predetermined area of the top layer, thereby forming the next cross-section of the product, on to of the first cross-section.

The steps of laying down a layer of powder and then focussing/scanning the electron beam over a predetermined area of the layer are repeated to form successive cross-sections of the product 2, thereby gradually building the product from the bottom up. During the initial stages of the method to form the particular exemplary product shown in FIGS. 8 and 9, these steps are repeated to form identical and vertically aligned cross-sections of the product, thereby building up the lower part of the product 2, below the passage 10. It is to be noted that during this stage of the method, the respective predetermined areas 17 of each successive layer of powder are thus all aligned with one another.

Figure 12:
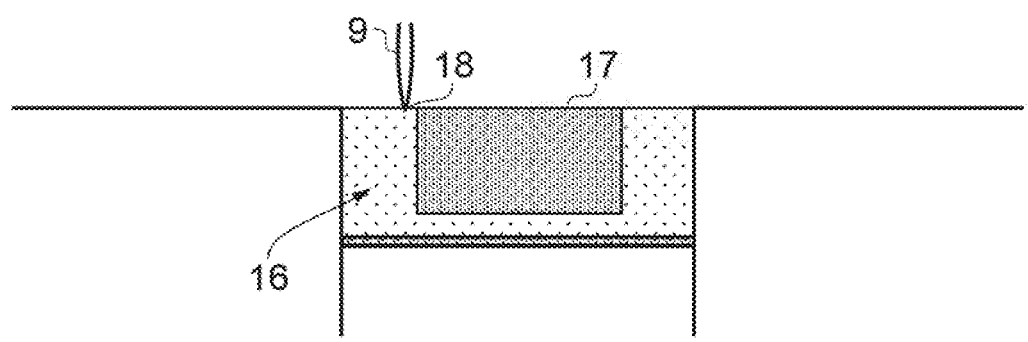
FIG. 12 shows another subsequent step of the ALM process involving the fusion of areas of a layer of powder.

FIG. 12 illustrates a stage during the formation of the product 2 at which the lower part of the product 2 with uniform cross-section below the passage 10 is complete. This drawing therefore shows the final cross-section of the lower part of the product having just been formed by melting a predetermined area 17 of the top layer of powder on the powder bed 16. Before the table 4 is subsequently lowered ready for the next powder layer to be laid on the powder bed 16, the electron beam 9 is refocused on a relatively small designated tool area 18 of the top layer of the powder bed. The tool area 18 is spaced from the predetermined 17 area of the same layer of powder which is fused to form the cross-section of the lower part of the product 2.

As will be appreciated, focussing the electron beam 9 on each of the tool area 18 melts the powder in that areas, thereby fusing the powder. The fused tool area 18 of the top layer of powder thus forms an initial cross-section of the tool 12, and effectively the first end of the tool 12.

It is to be noted that the first end of the tool 12 is thus formed in the top layer of the powder bed 16 (at the stage illustrated in FIG. 12), and is spaced from the product 2. As will be appreciated hereinafter, this means that the end of the tool 12 will project outwardly of the passage 10 (still to be formed at the stage illustrated in FIG. 12).

A series of further successive layers of powder then continue to be laid on the powder bed 16. When each layer has been laid, the electron beam 9 is focussed on a correspondingly shaped but slightly offset tool area 18 to melt the powder material in the support area and thereby steadily build up successive cross-sections of the tool 12, as shown schematically in FIG. 13. Because the successive tool area 18 of each powder layer which is melted to form the tool 12 are slightly offset from one another, the tool is gradually built up to follow the serpentine path of the passage 10.

Figure 13:
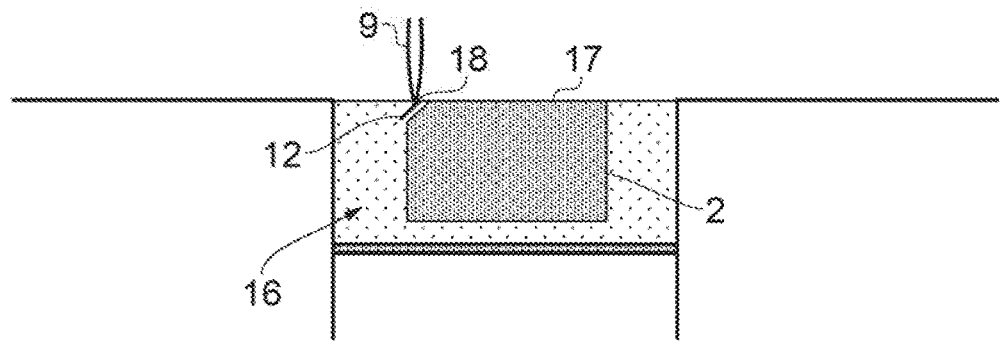
FIG. 13 shows a further subsequent step of the ALM process, showing in particular the formation of a tool as well as the product.

As will also be evident from FIG. 13, the electron beam 9 also continues to be focussed on respective predetermined areas 17 of the layers to melt the powder material in the predetermined areas 17 and thereby define respective cross-sections of the product. However, the predetermined areas 17 of each layer which are melted during this stage of the procedure differ from one another in the sense that each successive predetermined area 17 is slightly smaller than the preceding one. The serpentine lower region of the passage'2 internal surface is thus built up gradually in this way, layer by layer.

Figure 14:
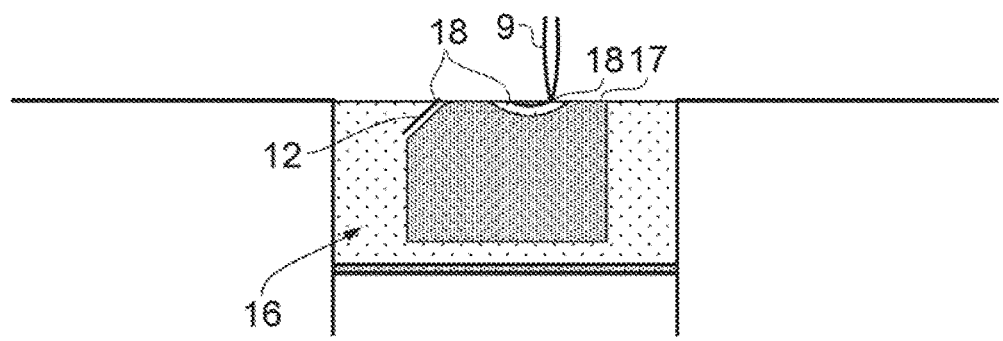
FIG. 14 shows another subsequent step in the ALM process, showing the product still partially formed but with its cavity and the tool substantially complete.

FIG. 14 shows a subsequent stage in the simultaneous production of the product 2, with the tool located in position within the gradually forming passage 10. As will be appreciated by the skilled person, in light of the foregoing, the size and position of each successive predetermined area 17 and tool area 18 is determined in dependence on the desired profile of the passage 10 and its associated tool 12.

Figure 15:
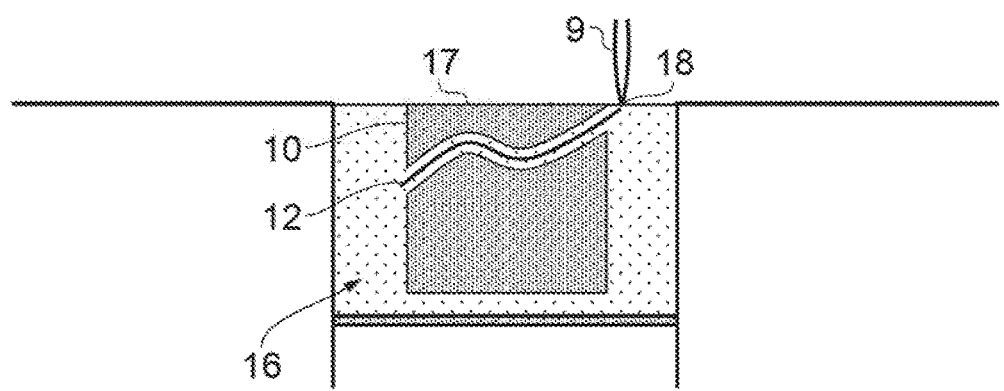
FIG. 15 shows yet another subsequent step in the ALM process.

FIG. 15 illustrates the product 2 at a stage in the production process in which its passage 10 is completed, and in which the tool 12 within the passage is also substantially completed, with the final tool area 18 being fused by the electron beam 9 to form the second end of the tool, which it will be noted also projects outwardly from the now complete passage 10. The upper region of the product 2 can then be formed by continuance of the process to fuse successive predetermined areas 17 of the powder layers and thereby define the remaining cross-sections of the product.

Once the simultaneous EBM production of the product 2, with its associated tool 12 in position within the passage 10, the product and tool can be removed from the EBM apparatus for post-production processing, and of course most notably removal of the cake of sintered powder which will be present around the product and within the passage in the manner described above. This can be achieved by a combination of a conventional air-blasting technique and via vibration of the tool 12 within the passage 10 in the manner described above to disintegrate at least a proportion of any sintered powder remaining within the passage after the air-blasting step. Alternatively, the tool 12 can be manipulated in a vibratory manner to disintegrate a proposition of the sintered powder within the passage before subsequent air-blasting. The tool 12 can be removed from the passage and discarded after use.

Whilst the tool 12 has been described above with reference to a particular method of production in which the tool is formed in spaced relation to the internal surfaces of the passage 10, and thus effectively in a central position within the passage supported by the sintered powder therein arising from the EBM process, it is to be appreciated that the tool could be formed so as to be initially connected to the structure of the product, for example by a plurality of breakable connecting tabs co-formed via the same EBM process. After completion of the product 2 and the tool 12, the tool 12 could then be snapped free from the product by breaking the connecting tabs to facilitate its subsequent manipulation to remove sintered powder.

Figure 16:
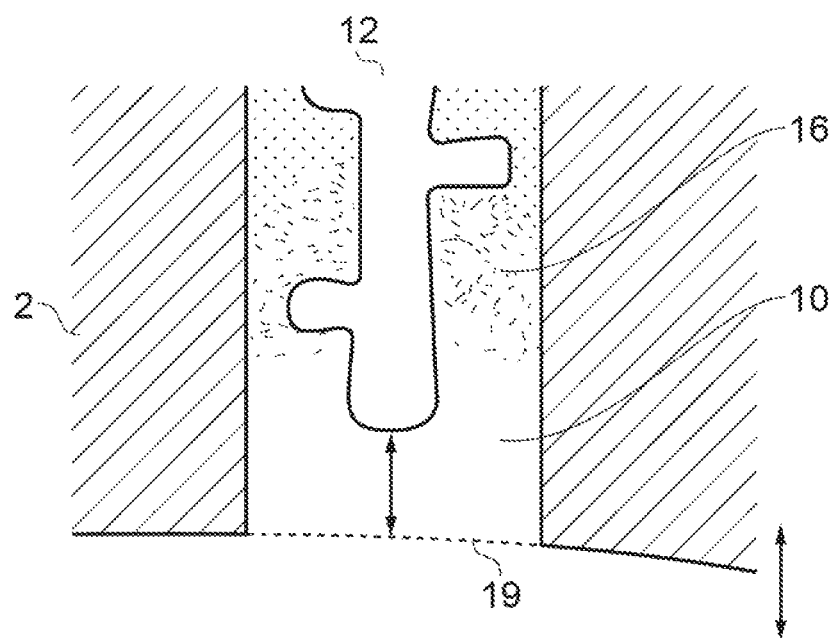
FIG. 16 shows apparatus used in one embodiment of the optional vibrating step of the invention.
Figure 17:
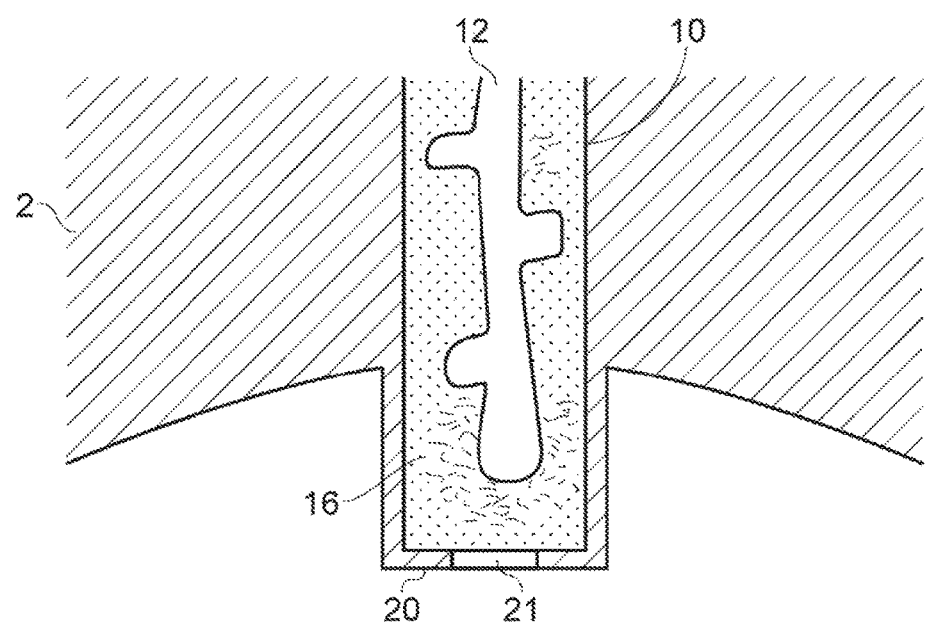
FIG. 17 shows apparatus used in another embodiment of the optional vibrating step of the invention.

Optional methods for effecting the manipulation of the tool are further described in FIGS. 16 and 17.

Passages (channels) 10 are formed in the component 2 and are shown partly filled with powder 16. A tool 12 is contained within the channels by a containment grid 19. Vibration of the tool 12 (or optionally the product 2) in the direction indicated by the arrows causes the tool 12 to oscillate within the channel and repeatedly impact on the exposed face of the powder 16. Powder which is loosened by the impact of the tool 12 exits the channel 10 through the grid 19 and can be recycled.

In a method according to an embodiment of the present invention, the tool 12 and grid 19 are manufactured using the EBM method as part of the manufacture of product 2 so as to contain the tool 12 within the channel 10. This method is illustrated schematically in FIG. 16.

The grid/bar contains the tool 12 within the channel 10 allowing loosened powder to fall out of the channel by gravity. The powder 16 is loosened by vibrating the tool 12 (or optionally the component 2), causing the tool 12 to repeatedly impact on the powder as described in more detail below. This process may require a degree of manual set up to clear the first portion of the channel 10, to enable free movement of tool 12.

To improve the automation of the clearing process, in another embodiment, as illustrated in FIG. 17, the tool 12 and a containment feature 20, 21 are sintered in during the manufacture of the hollow component 2. The tool 12 is loosened prior to, or as part of, starting a vibrating step to enable the tool to gather momentum within the channel 10 and start the clearing process. For example a dropout 21 may be provided in the containment feature wall 20 which is formed of looser powder (e.g. similar to the powder formed in the cavity or channel 10). This dropout 21 may be shaken free at the start of the cleaning process. Alternatively, if sufficient energy is imparted to the component by the vibrating step, the tool 12 may, by virtue of being more solidly formed than the surrounding material, shake itself free to start its motion. The containment feature 20, 21 can be removed along with the manufacturing support structures following the clearing process.

In the described cleaning methods, once the tools 12 are contained in the channels 10, the component 2 will be attached onto a vibration rig or other machine that is a source of vibration. The product 2 or tool 12 will be vibrated in the orientation of the axis of the channel. This will cause the tool 12 to travel back and forth along this path. Transfer of momentum to the tool 12 propels it through the powder 16 with high kinetic energy. The tool will impact the powder 16 on its exposed edge causing high local pressure on the powder causing it to break up and fall out of the product 2 under gravity (bottom aperture) or by the motion of vibration (top aperture). This continuous removal of the powder out of the channel 10 prevents dampening of the motion of the tool 12 as the cleaning progresses.

The tool 12 will continue to scavenge out the remaining powder 16 as time progresses as long as there is sufficient amplitude and energy input into the system. Optimisation of this process can be achieved by the use of a closed loop feedback system. This system controls the input frequency and amplitude by matching it to the depth of the powder cleared.

Upon completion of the clearing process, the containment feature 20, 21 and the tool 12 can be removed from the product 2.

FIGS. 16 and 17 illustrate an embodiment of the tool which incorporates ribs or spikes extending radially from its longitudinal axis. As mentioned above, these can further assist an agitation and dislodgement of powder when the tool is caused to vibrate.

Furthermore, whilst the present invention has been described above with specific reference to manipulation of the tool 12 to remove sintered powder from the product 2, in its broadest sense the invention can cover manipulation of the tool to perform other alternative processing functions on the product. For example, it envisaged that in some embodiments the material forming the tool 12 could be chemically treated or reacted to make it harder than the material forming the product. Chemically treating could include carburising or nitriding for example. This would then permit the tool to be used to polish adjacent surfaces of the product, such as the internal surfaces of a small and/or narrow cavity which would otherwise be unreachable by conventional polishing methods.

Figure 18:
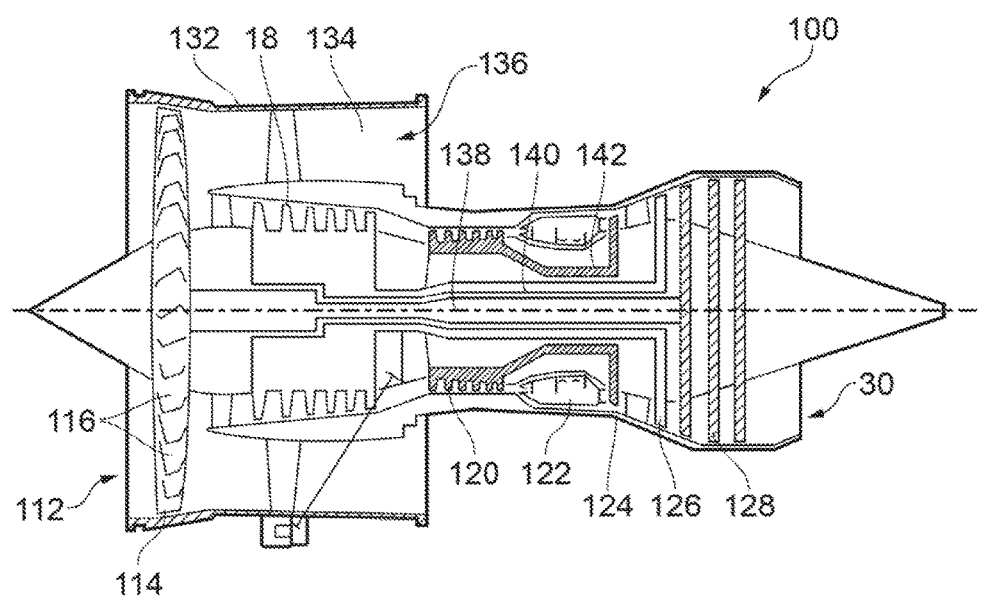
FIG. 18 shows a conventional gas turbine engine.

The invention may be used to manufacture components for a gas turbine engine 100 as shown in FIG. 18. The components may include any suitable components such as, for example, aerofoils, vanes, brackets, cowlings, air inlet scoops and combustor tiles. The skilled person may be aware of other components having one or more cavities or hollow portions which may benefit from the invention.

Thus FIG. 18 shows a ducted fan gas turbine engine 100 comprising in axial flow series: an air intake 112, a propulsive fan 114 having a plurality of fan blades 116, an intermediate pressure compressor 118, a high-pressure compressor 120, a combustor 122, a high-pressure turbine 124, an intermediate pressure turbine 126, a low-pressure turbine 28 and a core exhaust nozzle 130. A nacelle 132 generally surrounds the engine 100 and defines the intake 112, a bypass duct 134 and a bypass exhaust nozzle 136. The engine has a principal axis of rotation 131.

Air entering the intake 112 is accelerated by the fan 114 to produce a bypass flow and a core flow. The bypass flow travels down the bypass duct 134 and exits the bypass exhaust nozzle 136 to provide the majority of the propulsive thrust produced by the engine 100. The core flow enters in axial flow series the intermediate pressure compressor 118, high pressure compressor 120 and the combustor 122, where fuel is added to the compressed air and the mixture burnt. The hot combustion products expand through and drive the high, intermediate and low-pressure turbines 124, 126, 128 before being exhausted through the nozzle 130 to provide additional propulsive thrust. The high, intermediate and low-pressure turbines 124, 126, 128 respectively drive the high and intermediate pressure compressors 120, 118 and the fan 114 by concentric interconnecting shafts 138, 140, 142.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method for the production of a three-dimensional product having a cavity, the method comprising:
    producing the product having the cavity via an additive layer manufacturing process to selectively fuse parts of a powder bed, said parts corresponding to successive cross-sections of the product,
    removing a cake of sintered powder from at least an external surface of the product,
    forming a tool at least partially within the cavity by selectively fusing additional parts of the powder bed through the use of said additive layer manufacturing process, said additional parts corresponding to successive cross-sections of the tool,
    hardening the material of the tool to make it harder than the material forming the product, and
    manipulating the tool whereby to polish an internal wall of the product which bounds the cavity.

2. The method according to claim 1, wherein hardening includes chemically treating the material of the tool.

3. The method according to claim 2, wherein hardening includes carburizing or nitriding the material of the tool.

4. The method according to claim 1, wherein said additive layer manufacturing process is used to form said tool simultaneously with at least part of said product.

5. The method according to claim 4, wherein the additive layer manufacturing process comprises the steps of: a) laying down a powder layer on said powder bed, and b) focussing energy on a predetermined area of said powder layer to fuse said area of the powder layer and thereby form a cross-section of the product; wherein steps a) and b) are repeated to form successive cross-sections of the product, and wherein at least some of said successive steps b) include focussing energy on a designated tool area of the respective powder layer, to fuse the tool area and thereby form successive cross-sections of said tool within the powder bed.

6. The method according to claim 5, the method being used to manufacture a metal component, in which said powder is metal powder, and in which said steps of focussing energy on said areas of the powder layers includes the use of an electron beam to melt said areas of the powder layers.

7. The method according to claim 1, wherein said additive layer manufacturing process is an electron beam melting process.

8. The method according to claim 1, wherein said tool is formed in spaced relation to at least one surface of the product.

9. The method according to claim 8, wherein said tool is shaped such that at least part of the tool substantially conforms to the shape of the or each said surface.

10. The method according to claim 1, further comprising using the tool to remove sintered powder, arising from the additive layer manufacturing process, from the cavity during or prior to polishing.

11. The method according to claim 1, wherein manipulating the tool includes vibrating the tool.

12. The method according to claim 11, wherein the tool is subjected to ultrasonic vibrations.

13. The method according to claim 1, wherein said tool is formed in a position in which part of the tool projects from the cavity, said projecting part of the tool being used for manipulation of the tool.

14. The method according to claim 10, wherein said tool is formed in a position in which part of the tool projects from the cavity, said projecting part of the tool being used for manipulation of the tool.

15. The method according to claim 1, wherein said cavity is a passage extending through at least part of the product.

16. The method according to claim 15, wherein said tool extends completely through said passage in spaced relation to the or each internal surface of the passage.

17. The method according to claim 15, wherein said passage follows a non-linear path, and wherein said tool is shaped to follow said path.

18. The method according to claim 1, wherein the product is a component of a gas turbine engine.

19. The method according to claim 1, wherein removing the cake of sintered powder from at least the external surface of the product includes air-blasting.

20. The method according to claim 1, wherein removing the cake of sintered powder from at least the external surface of the product occurs before removing sintered powder within the cavity using the tool.

* * * * *